May 15, 1962 — E. I. RIEGNER — 3,034,342
STRAIN INDICATOR
Filed May 18, 1959
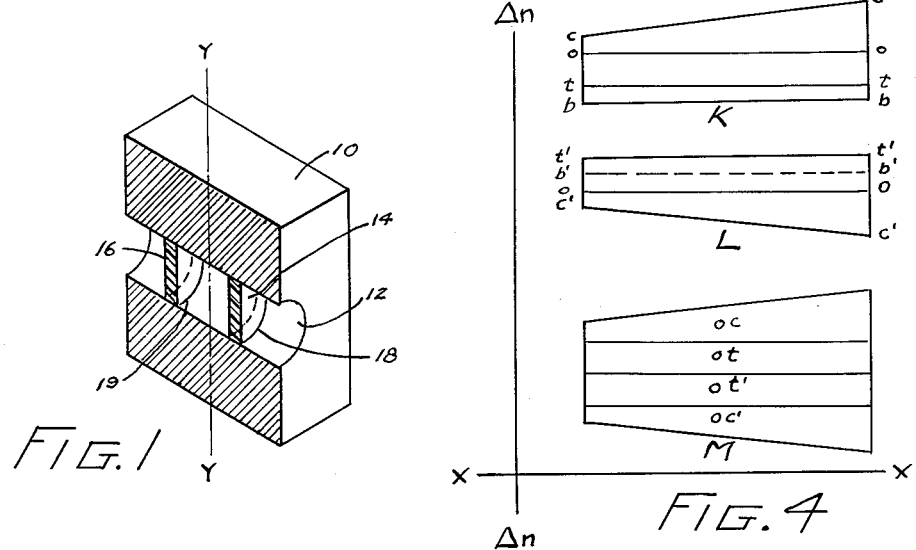
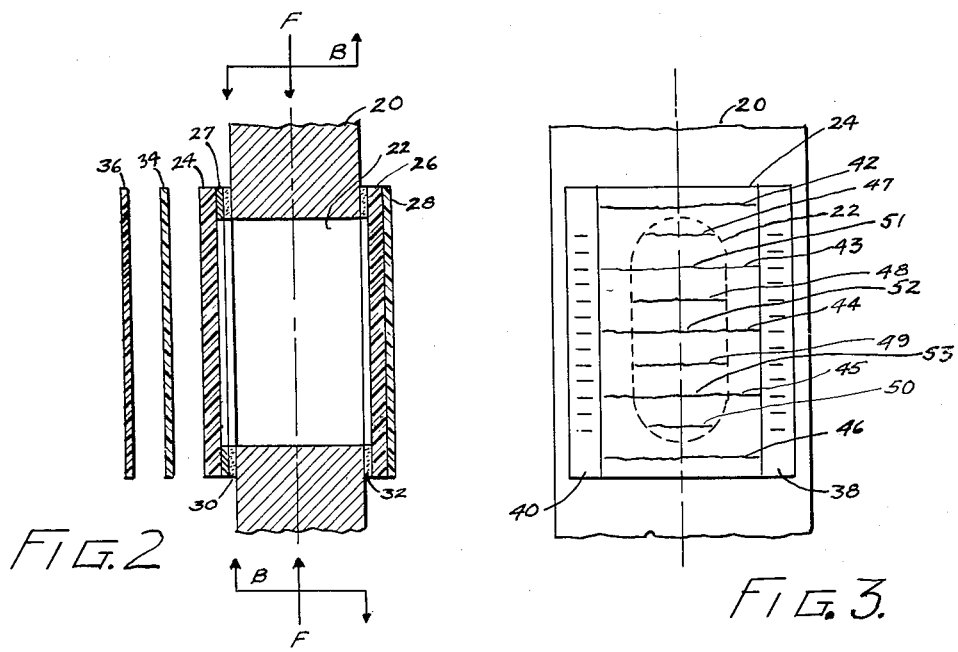
INVENTOR
EARL I. RIEGNER
BY Thomas J. Davenport
ATTORNEY ically about a longitudinal axis, yy and apertured normally of the axis to provide bore 12. Photoelastic test piece strata 14 and 16 are oriented laterally of the bore 12 and attached to the strut 10 by means of an adhesive material at the faying surfaces 18 and 19.

3,034,342
STRAIN INDICATOR
Earl I. Riegner, Pottstown, Pa., assignor, by mesne assignments, to The Budd Company, Philadelphia, Pa., a corporation of Pennsylvania
Filed May 18, 1959, Ser. No. 813,830
4 Claims. (Cl. 73—88)

This invention pertains to strain indicator means and methods and more particularly to a photoelastic strain indicator means and methods adapted for the resolution of one or more of the strain components induced in a loaded strut.

While previous applications have been made of forced-birefringent sheet material for the presentation of strain information in the form of variable fringe patterns, there has been no satisfactory photoelastic method or apparatus resolving strain effects due to a single type of loading, by axial forces, for example, from strain effects due to other simultaneous loadings. In the general application of a photoelastic sheet bonded to the surface of a loaded strut, the resultant fringe pattern does not distinguish between surface strains produced by tensile loading and those produced by bending normal to the plane of the gauged surface. Further the presence of torsional loads or bending loads in any direction hampers quantitative evaluation of tensile loads by conventional means. Tensile, as used herein, contemplates both tension and compression forces acting in an axial direction.

Therefore, it is a general object of this invention to provide improved photoelastic methods and apparatus resolving composite loading strains.

A further object is to provide photoelastic indicator methods whereby workpiece strains due to tensile loads are resolved in the presence of other workpiece strains.

A more specific object is to provide a strain indicator for variably loaded struts yielding quantiative information for resolving simultaneous tensile and non-tensile loadings of the strut.

This invention comprises a combination of a load receiving strut shaped symmetrically about a longitudinal axis and apertured normally of the axis to define a bore through the strut; and two test piece strata oriented laterally of the bore and attached to the strut on opposite sides of the axis and strained in proportion to strains induced in the strut.

According to the method of this invention two birefringent test piece strata are oriented with respect to a workpiece subjected simultaneously to first and second loadings so as to be strained equally in the same direction in proportion to the first load and equally but in opposite directions in proportion to the second load. A beam of polarized light is directed through both strata to interpose in the path of the beam a composite refractive index pattern independent of the second loading.

A better understanding, however, of this invention together with further objects and advantages will be had upon consideration of the following explanation and the drawings wherein:

FIG. 1 is a cross section perspective view of a simplified embodiment of this invention;

FIG. 2 is a cross section elevation view of a preferred embodiment of this invention together with auxiliary photoelastic apparatus;

FIG. 3 is a front elevation of the embodiment of FIG. 2 with a representation of fringe patterns related to tensile and composite loads; and FIG. 4 is a diagram explaining refractive index patterns exhibited by test piece strata in the embodiment of FIG. 2 and FIG. 3.

In FIGURE 1, a load receiving strut 10 is formed sym-

The photoelastic test piece strata 14 and 16 each comprise forced-birefringent material in which a refractive index difference pattern is induced by and related to an applied strain (deformation). A load applied to the strut 10 causes deformation of the strut in the planes of the test piece strata 14 and 16 and hence a proportional deformation of the forced-birefringent material. The composite refractive index pattern presented by the two similar, parallel test piece strata 14 and 16 to light transmitted through both, is independent of equal strain components of opposite signs applied respectively to the two strata. The test piece strata are spaced equally from the neutral plane of the loaded strut 10, and parallel therewith so that a condition of equal but opposite deformation results for those components of the load on strut 10 which cause bending normal to the neutral plane and, therefore, the composite refractive index pattern will be independent of such components. Any axial load applied to strut 10, however, will cause strains in test piece strata 14 and 16 which are similarly directed and, therefore, the composite refractive index pattern will be proportional to the axial load. Any bending moment parallel with the neutral plane, though codirectional in its effect upon strata 14 and 16 apparent in the composite refractive index pattern, will not affect the composite pattern along its center line (along the line of intersection of the normal neutral plane for the strut). It will be apparent then that the composite refractive index pattern along the center line of the test piece strata will depend only upon the axial load applied to the strut.

The refractive index pattern may be observed visually as an interference fringer pattern by means of the auxiliary apparatus illustrated in FIGURE 2 and FIGURE 3 in connection with a preferred embodiment of this invention. In FIGURE 2, a rectangular strut 20 is apertured normally of its longitudinal axis to define a bore 22. The strut 20 may be, for example, an element of a testing machine or the like transmitting loads from loading means to a test specimen for studies of the physical properties of the specimen. In such an application and in many others, it is necessary to known the tensile load on the strut 20, more generally, the tensile load transmitted through the strut 20, as differentiated from the total load on or transmitted through strut 20. According to its invention, therefore, test piece strata 24 and 26 are oriented contiuguous with the opposed surfaces of strut 20 which are intersected by a bore 22 so as to overlap the bore 22. Applied to the stratum 24 about the perimeter of the bore 22 is a reflecting layer 27, the purpose of which is more fully described hereinafter. Either directly, or indirectly, as illustrated, stratum 24 is attached to strut 20 by an adhesive bonding medium illustrated as layer 30 surrounding the perimetral edge of bore 22. Similarly, test piece stratum 26 is attached to strut 20 by an adhesive bonding means shown as layer 32. A reflecting layer 28 is illustrated as contiguous with the external surface of test piece strata 26. Associated auxiliary photoelastic apparatus includes the conventional polarizer 36 and quarter wave plate 34 well known in the art of photoeleasticity. A comprehensive treatment of photoelastic fringe patterns is given in: Photoelasticity, M. M. Frocht, John Wiley and Sons, Inc., New York, 1941.

Ordinary light from a source at the left of the FIGURE 2 representation is axially directed through the bore 22, reflected at reflective coating 28, and returned axially of the bore to a viewing position at the left of the illustrated auxiliary apparatus. Light transmitted along this path passes twice through the portions of the test piece strata 24 and 26 overlapping bore 22. The consequent effect upon such light is the same as for transmission, but once, through test piece stratum twice the thickness of strata 24 and 26. It will be apparent that observations may be made of the test piece strata 24 and 26 by single transmission therethrough, when preferred, if reflecting coating 28 is omitted and the auxiliary apparatus is reoriented in a manner well known to the art for photoelastic investigations in one direction through photoelastic test pieces. The form illustrated in FIGURE 2, however, is preferred for convenience and because quantitative information concerning the composite loading of the strut 20 may be collected simultaneously with collection of information pertinent to resolution of tensile loading of the strut 20.

FIGURE 3 illustrates an elevational view of the indicator of this invention as seen through polarizer 36 and analyzer 34 of FIGURE 2 for explanation of fringe patterns in the area subtended by bore 22 and in the surrounding area of test piece stratum 24 due to reflection by reflector 27. A birefringent material when strained exhibits a refractive index pattern related directly to principal strain differences within the material. Due to the double refraction associated with the different refractive indices for perpendicularly polarized components of transmitted light, fringe patterns appear upon analysis of the transmitted light by means of an analyzer, usually a second polarizer oriented with its plane of polarization perpendicular to that of the light source. In the embodiment of FIGURES 2 and 3 the illustrated combination of a polarizer 36 and a quarter wave plate 34 serves as a plane polarizer for incident light and due to the rotation, 45° upon each traversal of plane polarized light, produced by the quarter wave plate 34, this combination also serves as a crossed analyzer for the reflected light returned to the viewing position.

The composite refractive index pattern within the area subtended by bore 22 is unaffected by strains due to bending of strut 20 in a plane perpendicular to test piece strata 24 and 26. However, the refractive index pattern within the area of stratum 24 surrounding bore 22 is affected by the tensile loading and also by the bending load. When bending tends to make the strut surface to which stratum 24 is attached, convex, the effect is of an additional tension imposed upon stratum 24; conversely when bending tends to make that surface concave, the effect is of an additional compression. Therefore, any difference between the refractive index difference patterns observable within two areas of stratum 24 is ascribable to the bending load and proportional thereto. Correction must be made, however, for a sensitivity difference, that is for the difference in the optical path length traversed by light passing through both test piece strata 24 and 26 and light passing only through test piece stratum 24. The correction has been obviated in some embodiments of this invention by increasing the thickness of a test piece stratum 24 throughout the area thereof surrounding a bore 22.

Test piece stratum 24 or both strata 24 and 26 may, preferably, comprise the combination birefringent compensator and forced-birefringent test pieces disclosed in the copending application: Serial No. 799,798, filed March 16, 1959, F. Zandman and A. Redner. The devices disclosed and claimed in that application comprise test piece strata having preformed therein linearly graduated refractive index difference patterns, so that in the absence of applied strains regular fringe patterns of parallel equally spaced fringes are exhibited upon analysis of transmitted polarized light.

FIGURE 4 is a diagram illustrating refractive index difference patterns in graph form. Ordinate distances parallel with the $\Delta n$ coordinate are equivalent to refractive index differences $\Delta n$. Abscissae positions represent longitudinal positions along a test piece stratum. Values of $\Delta n$ are invariant in the $y$ or lateral direction so that each of the lines shown defines a plane. At K, the refractive index difference variations for a first stratum, 24 of FIGURE 2, are represented by ordinates subtended between $oo$, and $cc$, in the absence of external loading. The corresponding fringe pattern is shown in FIGURE 3 within the area of stratum 24 surrounding bore 22 as regularly spaced portions of boundary fringes 42, 43, 44, 45 and 46. Tensile loading forces, F of FIG. 2, cause an additional refractive index difference represented by the ordinates subtended between $oo$ and $tt$. The result of the bending load, represented by couples B of FIG. 2, is an additive tensile refractive index difference effect similarly represented between $tt$ and $bb$.

At L the biasing refractive index difference pattern on a second stratum, 26 of FIG. 2, is represented between $oo$ and $c'c'$ and the tensile effect of the axial loading forces F between $oo$ and $t't'$. Here, however, the result of the bending load due to couples B is subtractive, as shown between $t't'$ and $b'b'$.

At M the composite refractive index difference pattern, presented to light transmitted through both strata 24 and 26, shows no effect due to the bending loads since ordinates $t$, $b$ and $t'$, $b'$ are equal and cancel in the algebraic addition of the patterns. The effective slope of the composite refractive index difference gradient can be seen as the sum of the respective slopes for each stratum so that the corresponding fringe pattern in the area subtended by bore 22 in FIGURE 3 comprises the more closely spaced boundary fringe portions 47, 48, 49, 50, 51, 52 and 53.

Returning to FIGURE 3, a composite loading of strut 20, including tensile loading, will result in a shift of the fringes 47 through 53 which is independent of equal but opposite deformation of the two birefringent test piece strata. Hence, a scale 40 may be provided for direct comparison with the composite fringe pattern shift. Scale 40 may be marked with indicia calibrated to be read directly in terms of tensile load.

The pattern of fringe portions 42 to 46 in the area surrounding bore 22 by light reflected from layer 27 is altered by the tensile load and also by a component of a non-tensile load. A scale 38 may, therefore, be designed to indicate the magnitude of a composite load on strut 20 by comparison with shifts of fringes 42 to 46. Differences between indications of scale 38 and scale 40 give, directly, the magnitude of the non-tensile loading on strut 20.

Various modifications of the invention will be apparent for different applications. For example, an apertured cylindrical strut may be provided with test piece strata in the form of cylindrical shells. In such an embodiment, torsional loading about the cylindrical axis will cause strains in opposed test piece strata which are equal in magnitude but oppositely directed and which cancel each other in their effect upon the composite refractive index pattern presented to a beam of light transmitted through both strata.

While the above illustrative examples contemplate test piece strata parallel with and equally spaced from the neutral axis of a strut, other orientations may be preferable in some instances. Where asymmetrical spacing is employed, the thickness of the strata may be adjusted to correct for disproportionate loading.

The foregoing disclosure has described and illustrated preferred strain indicator devices and methods according to this invention. It should be understood, however, that the invention is not limited to the precise arrangements and that other arrangements within the scope of the appended claims are to be considered within the purview of this invention.

What is claimed is:

1. A strain indicator for use with a beam of polarized light comprising a load receiving strut apertured normally of its neutral plane to define a bore through the strut, and two birefringent material test piece strata oriented laterally of the bore, attached to the strut on opposite sides of the neutral plane, and strained in proportion to strains induced in the strut whereby a component of said load is resolvable upon transmission of said beam serially through said strata.

2. A strain indicator for use with a beam of polarized light for resolving composite loadings comprising a symmetrical strut apertured to define a lateral bore through the strut, a first birefringent test piece stratum overlapping said bore at one end and attached to a first surface of said strut, a second test piece stratum overlapping said bore at its other end and attached to a second surface of said strut, a reflector contiguous with a portion of the inner surface of said first stratum and a reflector contiguous with the outer surface of said second stratum whereby said loadings are resolvable upon comparison of birefringence produced in portions of said beam reflected from said reflectors.

3. A strain indicator for use with a beam of polarized light for resolving at least one component of composite loadings comprising a load receiving strut apertured normally of its neutral plane to define a bore through the strut and two birefringent material test piece strata oriented laterally of the bore and attached to the strut on opposite sides of the neutral plane and strained in proportion to strain induced in the strut, at least one of said test piece strat comprising a combination birefringent compensator and forced-birefringent test piece having a permanent regular refractive index difference gradient preformed therein whereby at least one component of said loading is resolvable upon transmission of said beam serially through said strata.

4. A photoelastic strain indicator combination for use with a beam of polarized light for resolving at least one of first and second loading components, said indicator combination comprising first and second photoelastic test piece strata, load transmission means subjecting said first and second strata to unequal portions of each of said first and second loading components, and optical means directing a portion of said beam serially through both of said strata.

References Cited in the file of this patent

UNITED STATES PATENTS

| | | |
|---|---|---|
| 2,014,688 | Mabboux | Sept. 17, 1935 |
| 2,096,964 | Frocht | Oct. 26, 1937 |
| 2,415,436 | Maris | Feb. 11, 1947 |